(12) United States Patent
Schu

(10) Patent No.: US 8,419,949 B2
(45) Date of Patent: Apr. 16, 2013

(54) METHOD AND DEVICE FOR SEPARATING FOSSIL AND NATIVE ORGANIC SUBSTANCES

(75) Inventor: Reinhard Schu, Walkenried (DE)

(73) Assignee: Ecoenergy Gesellschaft fuer Energie-und Umwelttechnik mbH, Walkenried (DE)

( * ) Notice: Subject to any disclaimer, the term of this patent is extended or adjusted under 35 U.S.C. 154(b) by 544 days.

(21) Appl. No.: 12/438,864

(22) PCT Filed: Jul. 14, 2007

(86) PCT No.: PCT/DE2007/001263
§ 371 (c)(1), (2), (4) Date: Feb. 25, 2009

(87) PCT Pub. No.: WO2008/028444
PCT Pub. Date: Mar. 13, 2008

(65) Prior Publication Data
US 2010/0006515 A1  Jan. 14, 2010

(30) Foreign Application Priority Data
Sep. 6, 2006  (DE) .......................... 10 2006 042 161

(51) Int. Cl.
C02F 1/02 (2006.01)

(52) U.S. Cl.
USPC ........... 210/769; 210/770; 210/808; 210/173; 210/257.1; 210/259

(58) Field of Classification Search ................. 210/768, 210/769, 770, 808, 173, 252, 257.1, 259
See application file for complete search history.

(56) References Cited

U.S. PATENT DOCUMENTS

| | | | | |
|---|---|---|---|---|
| 3,910,775 A | * | 10/1975 | Jackman | 44/589 |
| 4,581,992 A | | 4/1986 | Koch | 100/117 |
| 4,599,002 A | | 7/1986 | Gutknecht | 366/85 |
| 5,413,618 A | | 5/1995 | Penningsfeld | 44/490 |
| 5,452,492 A | | 9/1995 | Hamilton | 15/340 |
| 5,611,268 A | | 3/1997 | Hamilton | 100/50 |
| 6,059,971 A | * | 5/2000 | Vit et al. | 210/174 |
| 6,110,674 A | * | 8/2000 | Nivens et al. | 210/634 |
| 6,145,766 A | | 11/2000 | Mraz et al. | 241/74 |
| 6,398,957 B1 | * | 6/2002 | Mandt | 210/532.1 |
| 7,469,846 B2 | | 12/2008 | Schu | 241/21 |

FOREIGN PATENT DOCUMENTS

GB  2049460  12/1980

* cited by examiner

*Primary Examiner* — Lucas Stelling
(74) *Attorney, Agent, or Firm* — Jonathan Myers; Andrew Wilford

(57) ABSTRACT

The invention relates to a method and a device for separating fossil and native organic matter from mixtures of organic substances. The invention is characterized by subjecting the mixture of organic substances to a dewatering step (30, 31), to thermomechanical cell lysis (32), to a subsequent dewatering step (33) and to a final sieving step.

9 Claims, 2 Drawing Sheets

US 8,419,949 B2

METHOD AND DEVICE FOR SEPARATING FOSSIL AND NATIVE ORGANIC SUBSTANCES

CROSS REFERENCE TO RELATED APPLICATIONS

This application is the US national phase of PCT application PCT/DE2007/001263, filed 14 Jul. 2007, published 13 Mar. 2008 as WO2008/028444, and claiming the priority of German patent application 102006042161.2 itself filed 6 Sep. 2006, whose entire disclosures are herewith incorporated by reference.

BACKGROUND OF THE INVENTION

The disposal of residential area waste and also industrial wastes is a problem in view of the sustainability which is being increasingly demanded politically. The routes taken hitherto, namely reducing amounts of waste by avoiding waste and introducing separate collection of valuable materials have had initial success. For the remaining wastes which consist essentially of a three-component mixture of inert substances, organic matter and water and which cannot be supplied to direct exploitation, proposals have already been made in WO 2005/051547 [U.S. Pat. No. 7,469,846]. In order to generate fractions which can be exploited materially and/or energetically, and to largely avoid landfill, a wet-mechanical treatment is proposed of compositions of matter which consist of inert substances, water and also organic substances having a water-soluble and biologically convertible fraction, wherein first the composition of matter is continuously mixed in a mixer with water as separation and washing agent, without separating the components of the mixture until a dry matter content to 15% to 25% is established. Hereafter, in a first stage, the composition of matter is discharged from the mixer using a conveyor, wherein, owing to the addition of water, the light components remain dissolved in a solid-liquid mixture having a dry matter content of 10% to 20%, whereas the heavy components settle and are separated by the conveyor as the first heavy inert fraction having a particle size >25 mm. Light organic substances having a particle size of 30 mm to 120 mm are sieved off from the remaining solid-liquid mixture as first organic light fraction, rinsed and pressed. This fraction can if appropriate after a drying be exploited energetically by combustion or gasification, if, when the corresponding limiting values are kept, material exploitation in agriculture does not come into consideration.

In a second stage, inert heavy substances having a particle size of 2 mm to 25 mm are first separated off from the remaining suspension having an adjusted dry matter content of 6% to 12% by gravity and subsequently further organic light substances of a particle size of 3 mm to 30 mm are separated off by sieving and washing. The organic fraction sieved off here can likewise be washed with water and pressed off.

In a third stage, further inert heavy substances of a particle size <2 mm are separated off from the remaining suspension having an adjusted dry matter content of 3% to 8% by centrifugal forces and thereafter further organic light substances of a particle size of 150 $\mu$m to 3 $\mu$m are separated off by sieving and washing. The filter cake which is formed in fine sieving may likewise be pressed off and used, for example in agriculture, as fertilizer or as soil improver, for which reason the organic matter is either composted in composting units or fermented in fermentation units and composted or dried and used as loose compost bed or as fertilizer.

In the further processing of organic compositions of matter which contain not only fossil but also native organic matter, the present invention makes a start.

According to the prior art, extrusion is known in plastics processing and for shredding of organic substances. Thus in DE 44 44 745, a method is described for producing high-grade plant substrate from precomminuted wood or wood wastes containing effluent sludge, liquid manure sludge, sewage sludge or biowaste using a screw extruder, in which the substances are continuously fed into the screw extruder at such a throughput that the wood and coarser components are shredded and intensively mixed with the additives at temperatures of above 100° C. The temperatures set are intended to ensure that pathogens, bacteria, viruses, spores or weed seeds are killed, an excessive water content is vaporized and a material emerges at the extruder head which is substantially aseptic and is of a structure which is particularly readily suitable as plant substrate.

DE 10 2004 054 468 A1 describes a method of anaerobic fermentation of plant substrates for producing biogas, in which, to achieve a detectably higher gas formation rate, upstream of the fermentation process there should be connected a preparation prestage by extrusion of the plant substrates outside the reactor, in such a manner that a high-grade homogenized biomass is formed, the cell structure of which is substantially destroyed. By targeted surface enlargement of the biogenic material, a more rapid nutrient availability for the methanogens should be achieved. When a double-screw extruder is used, in the flank regions of the screw shafts in the encapsulated and armored device, pressure conditions and temperature conditions are formed which are able to destroy explosively the cell structure of plant material and/or biomass. Here, pressures above $5\times10^6$ Pa and temperatures >120° C. are possible. It is a problem in these conditions that, for instance, plastics present in the material quantity stick together and form agglomerates which make subsequent separation of matter difficult. The method described in the publication, in addition, cannot be carried out without pretreatment of the starting materials, since without prior separation of inert matter, i.e. in particular the removal of stones, gravel, sand and metals, high wear of the plant must be accepted. A possible suitable pretreatment is described by the above cited WO 2005/051547 A1.

OBJECT OF THE INVENTION

It is an object of the present invention to specify an optimized method of separating fossil and native organic substances.

SUMMARY OF THE INVENTION

This object is achieved by the method as claimed in claim 1, which is characterized in that the organic composition of matter is subjected to a dewatering, a thermomechanical cell lysis, a redewatering and a final sieving. The cell lysis, that is to say a cell disruption, destroys the cell membrane and/or cell wall, as a result of which the cell content (also called cell lysate) is released. Of all possible cell lyses, namely enzymatic, chemical, thermal or mechanical, in the present case the thermomechanical cell lysis is selected as a combination of mechanical and thermal cell lysis, since here the cell disruption is possible with a high degree of dewatering, sanitation and also biological stabilization, expulsion of a readily degradable organic matter and of the cell water.

Thus the thermomechanical cell lysis should preferably be carried out at temperatures between 65° C. and a maximum of 120° C., further preferably at a maximum of 100° C. In addition, the pressure present should be between $10^6$ Pa and $5 \times 10^6$ Pa, in particular should not exceed the upper value of $5 \times 10^6$ Pa. Maintaining the abovementioned parameters ensures, in particular, that the plastics contained in the material stream do not stick together which makes later separation of the plastics from the remaining organic matter difficult. This is necessary, in particular, if in further use of the organic matter fraction the plastic fraction is not wanted or is not permitted by law, such as, for example, in the case of subsequent use of the organic matter fraction in the paper industry, in further agricultural exploitation, in use as material of the fibers present in the biomass fraction or is desired for exploitation of energy in special biomass power stations or for conjoined combustion in existing energy generation plants or for ethanol production by means of fermentation or gasification processes. Also, in the case of later pelleting or briquetting which is required for technical or logistical reasons, prior separation of plastic fractions is advantageous. In some circumstances, polyvinyl chloride (PVC) possibly present by separating off the plastic fraction must also be separated off and thereby the chlorine fraction must be reduced, which chlorine fraction is unwanted for the combustion owing to the corrosion problems or for reasons of flue gas purification applications. By separation of plastics, the heating value of the remaining biomass fraction is reduced which can be advantageous for special combustion technologies, such as, for example, grate firing. The plastic fraction which is separated off can, because of the high heating value, be exploited energetically and materially in an efficient manner in plants specially provided therefor. Finally, on carrying out the method, a high degree of purity of native organic matter may be established.

To optimize the result of sieving, preferably before sieving drying is carried out. Using the method according to the invention, the native organic matter is for the most part comminuted to a particle size of 2 mm to 5 mm or less, whereas soft and hard plastics are present in particle sizes between 2 mm and 5 mm. Apart from these different particle size fractions, which are a precondition for effective separation, drying prevents agglomerate formation by adhesion of native matter to fossil matter and/or to plastic parts which are intended to be ejected from the process.

According to one embodiment of the method according to the invention, the native organic matter obtained from the sieving process is recirculated to the dewatering and subsequent thermomechanical cell lysis or directly to the thermomechanical cell lysis, i.e. the material stream experiences repeatedly the treatment according to the invention of dewatering, cell lysis, redewatering, if appropriate drying and sieving. Remoistening of the material before the repeated treatment is necessary depending on the material.

Alternatively, the fossil organic matter obtained from the sieving is subjected to a subsequent single- or two-stage thermomechanical cell lysis, preferably with in each case redewatering and final sieving, whereby residual native organic matter still present can be ejected for increasing the degree of purity of the resultant end products.

According to a further embodiment of the invention, the introduced material can be preheated, in order to reach or significantly exceed the desired minimum temperature of 65° C. in the thermomechanical cell lysis, but without exceeding the above discussed maximum value.

Preferably, sieve sizes set in the only or first sieving are selected in such a manner that after drying native organic matter is sieved off at a sieve cut of 2 mm to 30 mm, and preferably this oversize matter, for increasing the degree of disruption, is fed in a circuit back to a thermomechanical cell lysis.

The present invention likewise relates to a device. This device has a screw press which has successively at least one dewatering stage and one lysing appliance for breaking open the cells, downstream of which is connected a sieving appliance for separating fossil and native organic matter.

BRIEF DESCRIPTION OF THE DRAWINGS

Further embodiments and advantages of the invention will be described with reference to the drawings. In the drawings

DETAILED DESCRIPTION OF THE DRAWINGS

Figure 1:
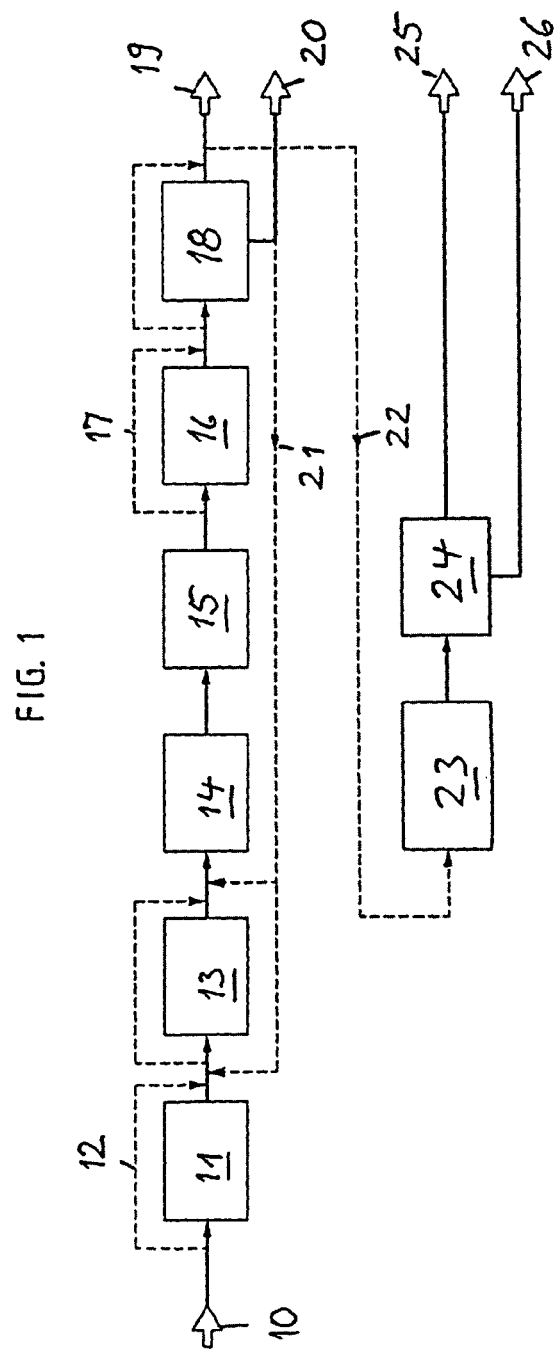
FIG. 1 shows a block flow chart of the method according to the invention and FIG. 2 shows a schematic drawing of a multistage screw press having a lysing appliance.

The material to be treated which contains native organic constituents and also hard and soft plastics is freed in the direction of the arrow 10 at the start in a first stage 11 from interfering matter, in particular from metals and inert matter. If the material supplied has passed through the separation methods according to DE 103 54 627 A1 (WO 2005/051547 A1), the material can be fed in accordance with the pathway 12 shown in dashed lines directly to the dewatering 13. Together with the wastewater there is discharged already dissolved organic matter which can be fed to an anaerobic and aerobic wastewater purification. In a subsequent stage 14 by operation or heating of the screw pressed used, a temperature elevation is achieved in the material to values of 65° C. to 120° C., preferably 95° C., at pressures between $10^6$ to $5 \times 10^6$ Pa.

Under these processing conditions, thermomechanical cell lysis proceeds, i.e. the native organic fraction is comminuted and shredded. The maintenance of a maximum temperature of 120° C., preferably below 100° C., is selected in order that the plastics contained in the material do not stick together. By means of the thermomechanical cell lysis, the cell water is liberated which can subsequently be expelled in a redewatering 15, as a result of which the biological stability of the presscake is improved and the dry matter content is increased markedly to a value which would not be achievable by mechanical dewatering.

The shredded and dewatered material has a flaky to fluffy consistency and, depending on the charged starting material, can be fed to a drying 16 or (see arrow 17) directly to a sieving 18 having a sieving cut from 2 mm to 30 mm. The sieving separates the selectively comminuted native organic matter part from the substantially uncomminuted plastics in the oversize matter. The native organic matter 20 is either directly discharged or (see arrow 21) channeled back into the process, after which the native organic matter is either again dewatered (if necessary) or again subjected to a thermomechanical cell lysis. The fossil organic matter obtained from the sieving is either discharged as material (see arrow 19) and fed to further utilization, preferably combustion, or corresponding to process pathway 22 fed to a further single- to two-stage thermomechanical cell lysis 23, if appropriate with a redewatering, before in a final stage a sieving 24 permits high separation selectivity of a fossil organic matter fraction 25 from a native organic matter fraction 26. A critical factor for whether the further single- to two-stage thermomechanical cell lysis 23 is carried out is whether significant plastic fractions are still contained in the material stream which can be removed by a finer sieving cut in stage 24.

For sanitation, in addition to the temperature and the residence time, the effects of the thermomechanical cell lysis must also be taken into account. The hygiene requirements of the product are dependent on the region and the starting material. A previous heating of the product and in some circumstances additional defined storage before or after the pressing process can effect optimum sanitation.

Figure 2:
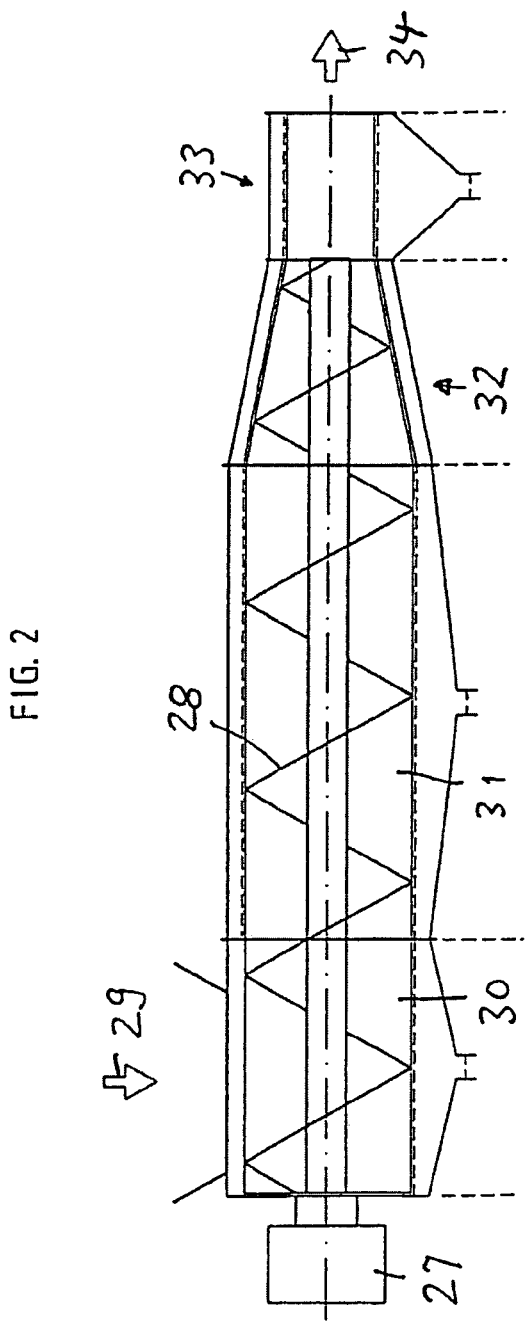

Keeping to the lower temperature of 65° C. is of greater importance for the thermomechanical cell disruption than the pressure setting. For instance, it has been observed, for example, that increasing the compression pressure to above $5\times 10^6$ Pa had no noteworthy effect on the cell disruption rate if the temperature of 65° C. was not exceeded. It must be assumed that at temperatures above 65° C. cells become unstable. The stability of the cell walls is produced, inter alia, by the fibrils which can consist, e.g., of cellulose, hemicellulose, pectin and lignin. The fibrils are bonded to one another by hydrogen bonds. Hydrogen bonds are unstable at elevated temperatures, as a result of which the fibrils can be displaced more readily with respect to one another and therefore lower shear forces are required for cell disruption. The temperature for shredding the cells should principally be introduced into the product via the mechanical energy and not, as frequently takes place in the prior art, by electrical heating which, owing to increasing costs of energy, just for economic reasons comes into consideration only secondarily, at any rate in order to set the desired temperature during cell lysis. In addition, the temperature control is of importance for improving sanitation. Zone Name: b7,AMD,M An essential constituent of the present invention is the screw press which is shown in FIG. 2 which operates a screw 28 via a drive 27 which predewaters the material introduced via the feed 29 in a first stage 30, dewaters it in a second stage and presses it before in region 32, which can be designated the lysis appliance, cell lysis is carried out. In this tapering region the cells become essentially unstable owing to thermal heating to approximately 95° C. and are broken up by shear forces, in such a manner that in a redewatering stage 33 the cell water which is released can be removed in such a manner that (see arrow 34) the fossil organic matter, freed from pressed-off cell water, can be taken off. The resultant material stream 34 can subsequently be fed directly to a sieving or a drying.

The invention claimed is:

1. A method of treating a residential or industrial waste water comprising plastic wastes and plant wastes to separate the plastic wastes from the plant wastes, which comprises the steps of:
    (a) dewatering the residential or industrial waste water comprising the plastics wastes and the plant wastes;
    (b) subjecting the dewatered residential or industrial waste water comprising plastic wastes and plant wastes to a thermomechanical cell lysis carried out at a temperature between 65° C. and 120° C., to disrupt cells in the plant wastes, so that the plant wastes are selectively shredded and comminuted while the plastics wastes remain substantially uncomminuted;
    (c) further dewatering the dewatered residential or industrial waste water comprising substantially uncomminuted plastic wastes and comminuted plant wastes obtained according to step (b) to expel additional water to obtain a presscake comprising uncomminuted substantially plastic wastes having a heating value and comminuted plant wastes; and
    (d) sieving the presscake dewatered according to step (c) to separate the selectively comminuted plant wastes from the substantially uncomminuted plastic wastes having a heating value to obtain the comminuted plant wastes as a cell lysate having a heating value.

2. The method defined in claim 1 wherein according to step (b) the temperature of the thermomechanical cell lysis ranges from 65° C. to 100° C.

3. The method defined in claim 1 wherein prior to step (d), a drying is carried out before the sieving.

4. The method defined in claim 1 wherein following step (d) the cell lysate having a heating value obtained from the sieving process is recirculated to the dewatering according to step (a) and the subsequent thermomechanical cell lysis according to step (b) or is recycled directly to the thermomechanical cell lysis according to step (b).

5. The method as claimed in claim 4 wherein the cell lysate having a heating value sieved off in the process at a sieve cut of 2 mm to 30 mm is recirculated in a recycling manner to the thermomechanical cell lysis according to step (b).

6. The method as claimed in claim 1 wherein following step (d) the substantially uncomminuted plastics wastes having a heating value obtained from the sieving is supplied to a subsequent single- or two-stage thermomechanical cell lysis, followed by a subsequent re-dewatering and final sieving.

7. The method as claimed in claim 1 wherein prior to step (a) the residential or industrial solid waste comprising plastic wastes and plant wastes is preheated.

8. The method as claimed in claim 1 wherein according to step (d) the substantially uncomminuted plastics wastes are separated out so that the heating value of the remaining plastics wastes is reduced.

9. A method of treating a residential or industrial waste water comprising plastic wastes and plant wastes to separate the plastic wastes from the plant wastes, which comprises the steps of:
    (a) dewatering the residential or industrial waste comprising the plastics wastes and the plant wastes;
    (b) subjecting the dewatered residential or industrial waste comprising plastic wastes and plant wastes to a thermomechanical cell lysis carried out at a temperature between 65° C. and 120° C., and at a pressure between $10^6$ and $5\times 10^6$ Pa to disrupt cells in the plant wastes, so that the plant wastes are selectively shredded and comminuted, while the plastic wastes remain substantially uncomminuted;
    (c) further dewatering the dewatered residential or industrial waste water comprising substantially uncomminuted plastic wastes and comminuted plant wastes obtained according to step (b) to expel additional water to obtain a presscake comprising substantially uncomminuted plastic wastes having a heating value and comminuted plant wastes; and
    (d) sieving the presscake dewatered according to step (c) to separate the selectively comminuted plant wastes from the substantially uncomminuted plastic wastes having a heating value to obtain the comminuted plant wastes as a cell lysate having a heating value.

* * * * *

UNITED STATES PATENT AND TRADEMARK OFFICE
CERTIFICATE OF CORRECTION

PATENT NO. : 8,419,949 B2  Page 1 of 1
APPLICATION NO. : 12/438864
DATED : April 16, 2013
INVENTOR(S) : Reinhard Schu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 544 days.

Signed and Sealed this

First Day of September, 2015

Michelle K. Lee
*Director of the United States Patent and Trademark Office*